United States Patent [19]

Itoi

[11] Patent Number: 5,667,423
[45] Date of Patent: Sep. 16, 1997

[54] METHOD AND APPARATUS FOR SLICING WORKPIECE

[75] Inventor: Kirio Itoi, Urawa, Japan

[73] Assignee: Shin-Etsu Handotai Co., Ltd., Tokyo, Japan

[21] Appl. No.: 620,032

[22] Filed: Mar. 21, 1996

[30] Foreign Application Priority Data

Mar. 25, 1995 [JP] Japan .................................. 7-091531

[51] Int. Cl.$^6$ .......................................................... B28D 1/04
[52] U.S. Cl. .......................... 451/5; 451/8; 451/41; 451/53; 451/69; 425/13.01; 425/13.02
[58] Field of Search ................................ 451/5, 7, 8, 10, 451/11, 41, 28, 53, 69, 54; 125/13.01, 13.02, 11.04, 11.18

[56] References Cited

U.S. PATENT DOCUMENTS 4,844,047   7/1989   Brehm et al. .

FOREIGN PATENT DOCUMENTS

| 0269997 | 6/1988 | European Pat. Off. . |
| 0535296 | 4/1993 | European Pat. Off. . |
| 0610967 | 8/1994 | European Pat. Off. . |
| 0633086 | 1/1995 | European Pat. Off. . |
| 61-47644 | 3/1986 | Japan . |
| 3-58805 | 3/1991 | Japan . |

OTHER PUBLICATIONS

IBM Technical Disclosure Bulletin vol. 25, No. 5, Oct. 1982.

*Primary Examiner*—Eileen Morgan
*Attorney, Agent, or Firm*—Oliff & Berridge

[57] ABSTRACT

Disclosed are an improved method and apparatus for slicing a workpiece such as a semiconductor ingot, in which coolant nozzles are disposed near the cutting edge of an annular blade, air nozzles are respectively equipped near the both side surfaces, the air nozzles are connected to a compressed air supply source via pressure regulators and electromagnetic valves, a deflection detector is located in the vicinity of one of the side surfaces, which detector is connected to the air nozzles via a computer and the pressure regulators, wherein, in the course of slicing, for example, if an actual deflection has been detected toward one of the side surfaces, the compressed air is blown from an adjacent air nozzle to the one of the side surfaces and the secondary pressure of the pressure regulator connecting to the adjacent air nozzle is regulated higher or lower, as the blade is deflected larger or smaller. In such a manner, deflection of the blade is minimized to decrease a warpage of a sliced wafer obtained by the annular saw blade method and apparatus.

10 Claims, 5 Drawing Sheets

METHOD AND APPARATUS FOR SLICING WORKPIECE

BACKGROUND OF THE INVENTION

1. Field of the Invention

The present invention relates to a method and apparatus for slicing a workpiece and more particularly, relates to a method and apparatus for slicing a semiconductor ingot into warpage-free wafers by preventing deflection of the inner cutting edge of an annular saw blade during the slicing.

2. Related Prior Art

In general, the slicing of a workpiece such as a semiconductor ingot is carried out by rotating an annular saw blade having a cutting edge at the inner periphery thereof at a high speed, while supplying a coolant to the cutting edge. The coolant is used for purposes of cooling of the cutting edge of a saw blade engaged in slicing, and removal of the workpiece powders accumulated on the cutting edge. The coolant covers both surfaces of the rotating saw blade including the cutting edge in a thin film and is removed away by a centrifugal force.

Figure 6:
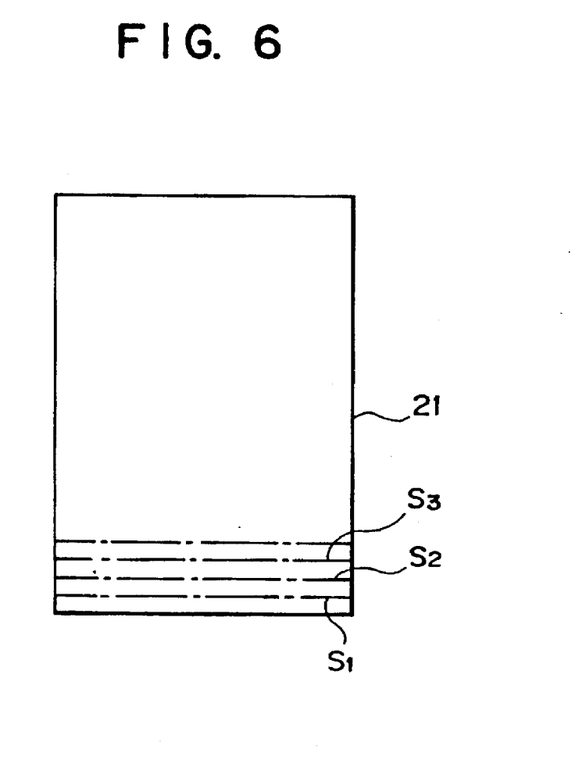
FIG. 6 is a illustrative representation of ideal cutting planes in the slicing of an ingot.

Referring to FIG. 6, in a slicing operation, cutting surfaces $S_1$, $S_2$ and $S_3$ of a semiconductor ingot 21 should preferably be parallel to each other and if so, high-quality wafers with no warpage are obtainable.

In order to realize the parallelism of the cutting surfaces $S_1$, $S_2$ and $S_3$, the cutting edge of a saw blade is required to advance straight through the ingot 21 during slicing.

Figure 7:
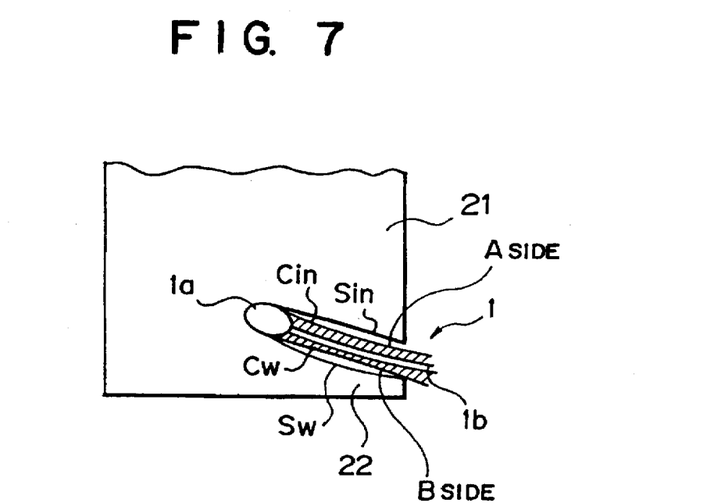
FIG. 7 is an enlarged representation illustrating the deflection of a cutting edge of a saw blade cutting partly through an ingot by means of a slicing method of the prior art.
Figure 8:
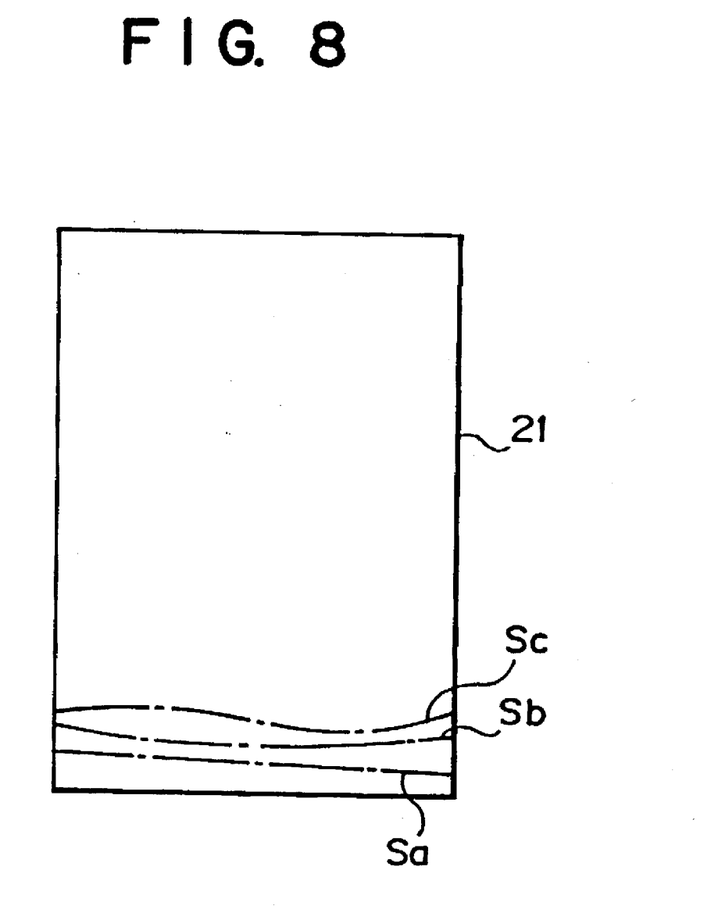
FIG. 8 is a illustrative representation of undesirable cutting planes in the slicing of an ingot by means of a slicing method of the prior art.

In the traditional methods and apparatuses, however, the cutting edge 1a of a saw blade 1 usually deviates to the direction of an ingot 21 as shown in FIG. 7 or, to the contrary, to the direction of a wafer 22 (not shown). As a result, as shown in FIG. 8, a cutting surface in the ingot 21 obliquely intersects the central axis of the ingot 21 and forms an inclined plane Sa, or a convexly or concavely curved surface Sb toward the wafer. In an extreme case, the cutting surface becomes a wavy surface Sc.

To sum up, it is difficult to obtain a warpage-free wafer and with much warpage in sliced wafers an yield of semiconductor devices fabricated thereon is reduced, which has been a problem.

A disclosure for slicing is made in a published document of unexamined Japanese Patent Application No. Hei 4-216013, which invention is entitled a cutting method for a slicing machine. In the disclosure, a slicing machine using an annular saw blade is shown, wherein air-nozzles are disposed near coolant nozzles and compressed air from the air nozzles removes unnecessary portion of the coolant on the blade which portion has no effect on the cutting.

According to the invention, dulling of the cutting edge of a saw blade is prevented effectively and a cleaning effect on the base metal portion of the blade is hightened.

The inventors of the present invention has confirmed, however, that such a method as above mentioned still has a difficulty in obtaining a warpage-free wafer.

One of the factors which causes deflection of the cutting edge of a saw blade is the difference in cutting sharpness between the A and B sides of the saw blade, wherein the A side surface faces an ingot and the B side surface faces a wafer being produced. The saw blade deflects to the side having better cutting sharpness. A deflection of the blade 1 is shown in FIG. 7 which deflection occurs when the sharpness on the side facing the ingot 21 is better, as an example of comparison in cutting sharpness between the two sides of the cutting edge 1a.

The inventors of the present invention have discovered that the deflection of the cutting edge of a saw blade is also caused by the imbalance in thickness between the coolant films on the A and B side surfaces of the base metal sheet 1b of the blade 1, said film being present in gaps both of which gaps are respectively formed on both side surfaces of the blade 1 between each cutting surface of the ingot and the side surface which faces said cutting surface.

A reason seems to be explained as follows: The imbalance in thickness between the coolant films causes the significant imbalance in size of the gaps each between any of the exposed coolant surfaces and one of the new cutting surface of the ingot being cut or a wafer being produced, which latter cutting surface directly faces the former coolant surface. The speeds of the air streams in the gaps relative to the saw blade are changed according to the sizes of the gaps, said air streams in the gaps relatively occurring by the rotation of the saw blade, since the air film on the surface the blade is transported into a gap together with the rotating blade. With a narrower gap, the relative speed increases to strengthen a degree of negativity in pressure in the space of the gap. The saw blade is attracted to a cutting surface of the ingot the gap on which is narrower in size than that on the other cutting surface.

In the above mentioned, published document, the deflection of the cutting edge of a saw blade is not prevented, since the imbalance in thickness between the coolant films on the blade surfaces of A and B sides cannot be eliminated, though the coolant film can be respectively thinned to some extent.

In addition, the thickness of a coolant film cannot be thinned to null, but will strenuously remain on the blade surfaces at a minimum because of viscosity. It is impossible to perfectly exclude the influence of the coolant upon slicing.

Gaps between the both cutting surfaces of an ingot and the both side surfaces of the base metal sheet 1b of a saw blade usually fall in the range of 50 μm to 100 μm. The cutting edge 1a of a saw blade 1 is, in general, made by bonding diamond abrasive grains on a blade base metal sheet 1b with a bond matrix such as nickel. The cutting sharpness imbalance between both sides of the saw blade 1 is caused by imbalance in worn-out degree of grains and/or in accumulation degree of removed workpiece material on the cutting edge between the both side thereof.

A blade deflection by the imbalance in thickness between the coolant films on the A and B side surfaces of a saw blade will be more particularly explained below in reference to FIG. 7.

A coolant film Cin exists at a thickness on the blade in the gap between the upper surface of the base metal sheet 1b and the cutting surface Sin of an ingot 21. Another coolant film Cw exists at a thickness on the blade in the gap between the lower surface of the base metal sheet 1b and the cutting surface Sw on a wafer 22.

With a lager difference in thickness between both coolant films on the upper and lower surfaces of the blade, a difference in size between gaps each from any of the exposed surfaces of the coolants to the corresponding cutting surface of Sin or Sw is larger. When the gap on the Sin cutting surface is narrower than that on the Sw cutting surface, the cutting edge 1a is attracted to the direction of the ingot 21. To the contrary, when the gap on the Sw cutting surface is narrower than that on the Sin cutting surface, the cutting edge 1a is attracted to the direction of the wafer 22. In such a manner as above described, the deflection of the blade occurs by the resultant force from the combination of the forces based respectively on the thickness imbalance of a coolant and on the sharpness imbalance in cutting of a saw blade.

In order to achieve an equalization in cutting sharpness on both sides of a saw blade, for example, dressing is applied to the cutting edge 1a, where the dressing is to recover the sharpness of a cutting edge by actually cutting a piece of green carborundum or dresser with the blade and thereby refreshing the cutting edge surface. However, even with such dressing, it is impossible to perfectly prevent the deflection or deviation of the cutting edge of the blade relative to a reference position.

SUMMARY OF THE INVENTION

In light of the above problems of the traditional technology, the present invention was made it is an object of the present invention to provide a method and apparatus for slicing a wafer from a workpiece such as an ingot, in which the warpage of a slice is decreased by reducing the deflection of the cutting edge of a saw blade and at the same time, the degree of thickness uniformity across a wafer is increased by regulating so as to have slicing surfaces parallel to each other during slicing.

The present invention is directed to a method for slicing a workpiece in which the workpiece is sliced into thin plates by a saw blade, while a coolant is supplied to both side surfaces of the blade having a cutting edge at its peripheral margin comprising the following steps of detecting a deflection of the blade at both side thereof and regulating a coolant film thickness on a first side surface of the blade, to which side surface the blade is deflected, so as to be thinner than that on a second side surface thereof.

The present invention is further directed to a method for slicing a workpiece in which the workpiece is sliced into thin plates by an annular saw blade having a cutting edge at its inner peripheral margin, while a coolant is supplied to both side surfaces of the blade comprising the following steps of decreasing by a predetermined amount the coolant film thickness on each side surface of a blade by continuously supplying compressed air to both sides of the blade, detecting the deflection of the blade at its both sides and regulating a coolant film thickness on a first side surface of the blade, to which side the blade is deflected, so as to be thinner than that on a second side surface thereof.

The present invention is still further directed to An apparatus for slicing a workpiece in which the workpiece is sliced into thin plates by a saw blade having a cutting edge at a periphery margin, while a coolant is supplied to both A and B side surfaces of the blade comprising air nozzles equipped near the both A and B side surfaces of the blade for blowing compressed air to the blade side surfaces, a compressed air supply source pneumatically connected to the air nozzles via respective pressure regulators, a deflection detector for the blade disposed near the A side surface of the blade; and a computer electrically connected to the deflection detector at the input port and at the output port to the above mentioned pressure regurators, wherein the deflection detector for the blade transmit electric signals to the computer and the same computer transmit electric signals to the air nozzles near the A and B side surfaces of the blade for regulating a secondary pressure or a pressure at an output port of one of the pressure regulators, higher or lower, as the blade is deflected larger or smaller.

In the firstly mentioned method of the present invention, a coolant film thickness on the first side surface of the blade, to which side the blade is deflected, is regulated to be thinner than that on the second side surface. In the situation, the gap between the cutting surface of the workpiece itself and the exposed surface of the coolant film on the first side surface is increased by the decrement of the film thickness and as a result, the attraction force between the base metal plate of the blade and the cutting surface of the workpiece is reduced to decrease the deflection of the blade.

In the secondly mentioned method of the present invention, a coolant film thickness is decreased by a predetermined amount, by continuously removing the coolant held on both side surfaces of the saw blade through a slicing operation. In a first aspect embodying such a method, it is made easier to correct the deflection of the blade, since the deflection of the blade becomes to be affected more by the imbalance in cutting sharpness between both side of the blade than by that in coolant film thickness therebetween. In a second aspect, the coolant film thickness on the first surface of the blade, to which the blade is deflected, is decreased to be thinner than that on the second surface thereof, as effected in the firstly mentioned method, while each coolant film thicknesses is continuously removed by the blowing air from the air nozzles, as in the first aspect just mentioned.

In the thirdly mentioned apparatus for slicing a workpiece, the compressed air is supplied to the A side and B side surfaces via the pressure regulators and the air-nozzles from the compressed air source, while a coolant is supplied to both A and B side surfaces of the blade, wherein the supply of the coolant and blowing of the compressed air both are continuously conducted. The detector located near the A side surface gives deflection signals to the computer, control signals from the computer system, which are created on the basis of the deflection-signals, are transmitted to the pressure regulators. The deflection of the blade is constantly monitored by the defection detector during slicing. When a deflection occurs in the direction of the A side, the compressed air is supplied from the air-nozzle located near the A side surface and when a deflection occurs in the direction of the B side, the compressed air is supplied from the air nozzle located near the B side surface. Besides, the secondary pressures of the respective regulators are controlled such that the secondary pressure of one of the pressure regulators is adjusted higher or lower, as the blade is deflected larger or smaller. When the blade has a larger deflection, the compressed air is blown to the blade under a higher pressure than when the blade has a smaller deflection. As a result, deflections in both directions are restricted to minimum values throughout a whole slicing operation.

BRIEF DESCRIPTION OF THE DRAWINGS

The novel features which are considered characteristic of the present invention are set forth with particularity in the appended claims. The present invention itself, however, and additional objects and advantages thereof will best be understood from the following description of embodiments thereof when read in connection with the accompanying drawings, in which:

DETAILED DESCRIPTION OF THE INVENTION

Below, description will be given about an embodiment according to the present invention in reference to the accompanied drawings.

Figure 1:
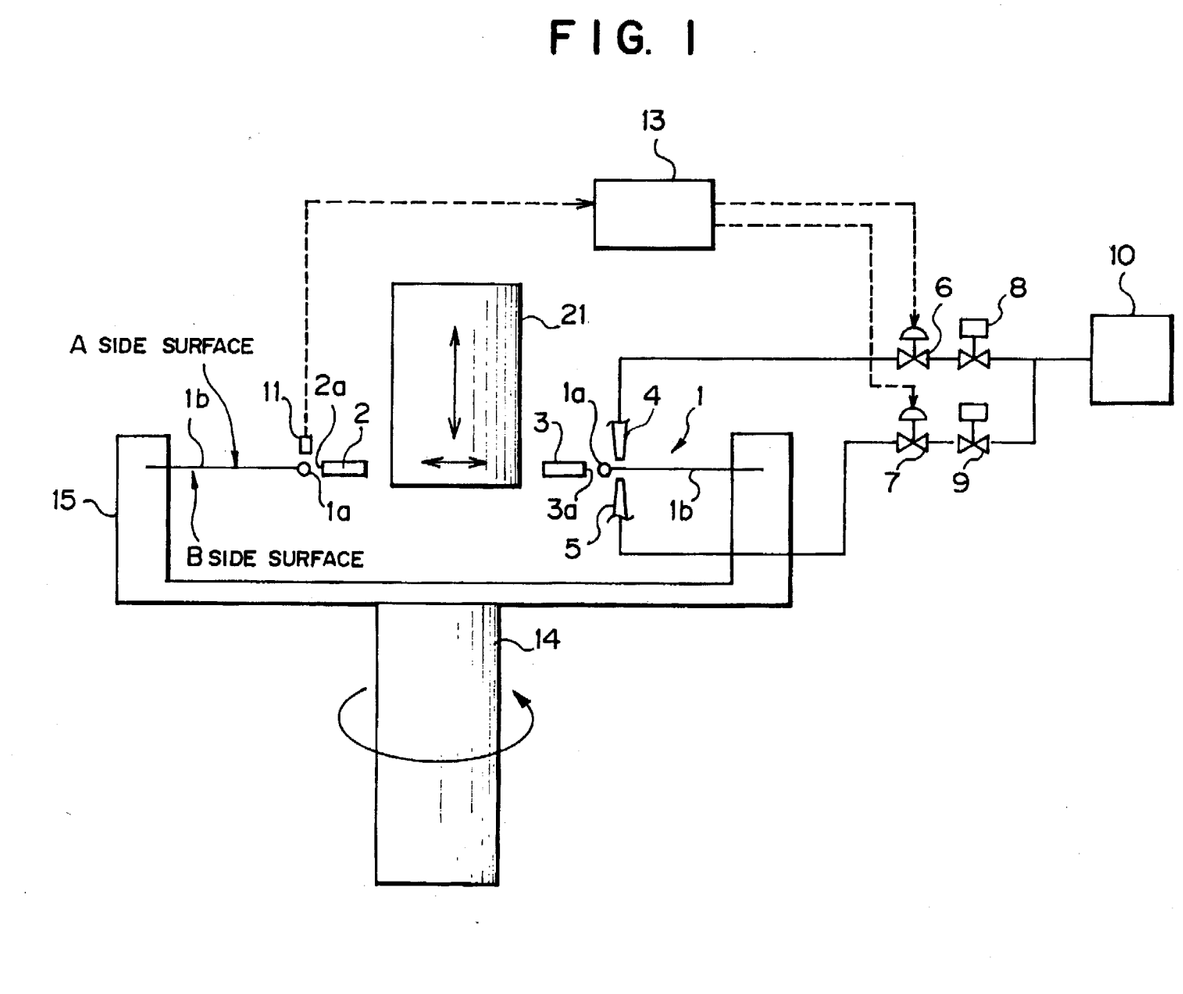
FIG. 1 is a block diagram showing a control system combined with a schematic sectional view of a chuck body with an annular saw blade clamped thereto and surrounding parts of an embodiment of the slicing apparatus of the present invention.
Figure 2:
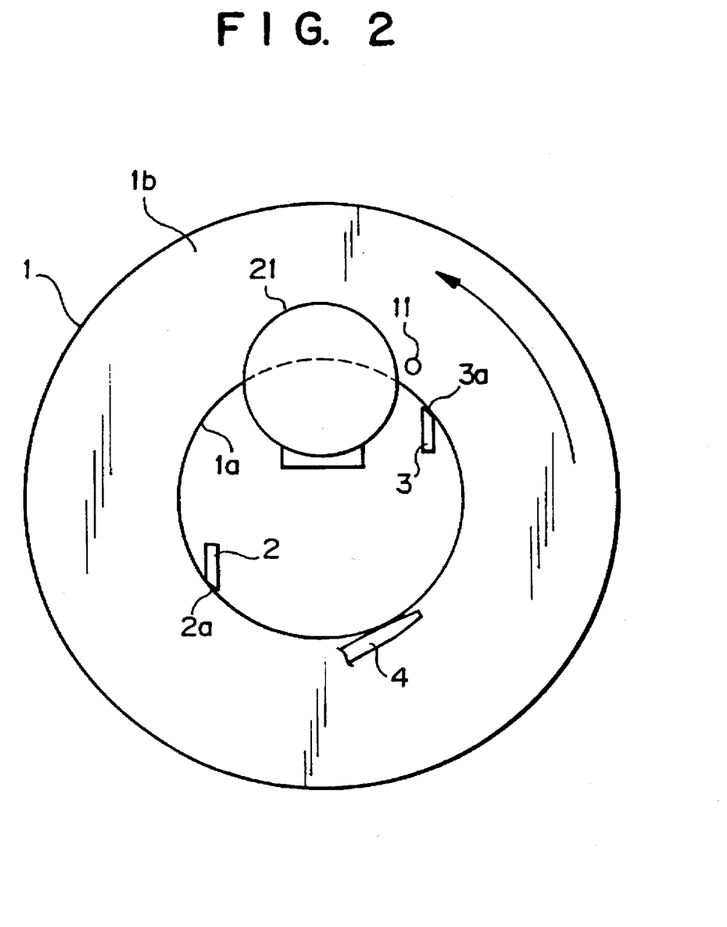
FIG. 2 is a schematic top view of the rotating annular saw blade and surrounding parts, said blade cutting half way through the ingot shown in FIG. 1.
Figure 3:
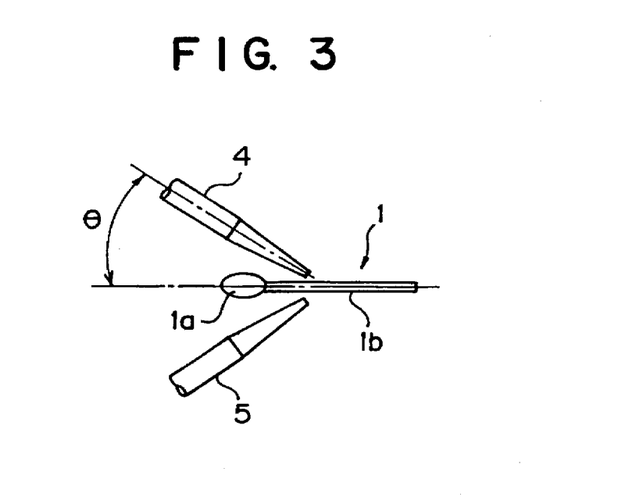
FIG. 3 is an enlarged representation of the air nozzles and the cutting edge portion of the blade shown in FIG. 1 together with those configuration.

FIG. 1 is a block diagram showing a control system combined with a schematic sectional view of a chuck body with an annular saw blade clamped thereto and surrounding parts of an embodiment of the slicing apparatus of the present invention, FIG. 2 is a schematic top view of the rotating annular saw blade and surrounding parts, said blade cutting half way through the ingot shown in FIG. 1 and FIG. 3 is an enlarged representation of the air nozzles and the cutting edge portion of the blade shown in FIG. 1 together with those configuration.

The slicing apparatus according to the present invention is adapted to slice a semiconductor ingot 21 in thin plates with a annular saw blade 1 having an inner peripheral cutting edge, while compressed air and a coolant are respectively supplied to both of A side and B side surfaces, as shown in FIGS. 1 and 2. In FIG. 1, a chuck body 15 is fixedly mounted on the upper end of a rotatable spindle 14 driven by a motor, not shown, and the blade 1 is clamped at the outer peripheral margin of the base metal sheet 1b thereof to the chuck body 15.

The bodies of coolant nozzles 2 and 3 are placed near the front of the cutting edge 1a in a plane including the blade 1 and the tips 2a and 3a of thereof are located close to, directly opposite to the front of the cutting edge so as to jet the coolant to wet the cutting edge 1a and further the surfaces of the inner peripheral margin of the blade 1.

Air nozzles 4 and 5 are disposed in the vicinity of the cutting edge 1a, as shown in FIGS. 1 to 3. The tips of the nozzles being respectively located close to the both side surfaces of the cutting edge portion of the blade 1 and directed outwardly and downwardly to the surfaces, the compressed air from said nozzles being respectively blown to both of the A side and B side surfaces of the blade 1. The air nozzles 4 and 5 are pneumatically connected to a compressed air source 10 by way of respective pressure regulators 6 and 7 and respective electromagnetic valves 8 and 9. An angle of inclination 8 of the air-nozzles 4 and 5 relative to each side surface is set, for example, at about 30 degrees. The ingot 21 is movable vertically and/or horizontally with a transferring device, not shown.

A blade deflection detector 11 is placed in the vicinity of the A side surface of the blade 1. The deflection detector 11 is electrically connected to the input port of a computer 13 and then the output port thereof is electrically connected to the pressure regulators 6 and 7. The deflection detector 11 is in particular located close to the cutting edge 1a, as shown in FIG. 1 in order to detect a deflection of the cutting edge 1a in an accurate manner.

The secondary side of the pressure regulator 5 is connected to the air nozzle 4 near the A side surface and the secondary side of the pressure regulator 6 is connected to the air nozzle 5 near the B side surface both in piping. The above assembly is operative such that pressure of the secondary side of the regulator 6 or 7 is controlled higher or lower as the blade 1 is deflected larger or smaller.

Next, a method in which wafers are obtained by slicing an ingot 21 in the above mentioned slicing apparatus will be described.

The saw blade 1 is rotated at a high speed in the direction of an arrow shown in FIG. 2 by the spindle 14. Then the supply of the coolant is started at a predetermined flow rate to both of the A side and B side surfaces and the continuous supply of the compressed air is also started to the same surfaces. The coolant is supplied through the coolant nozzles 2 and 3 and the compressed air is supplied through the air nozzles 4 and 5 via the electromagnetic valves 8 and 9 and the pressure regulators 6 and 7 from the compressed air source 10. The ingot 21 is shifted down by a distance by means of the transferring device and then moved in a horizontal direction for pressing itself to the cutting edge 1a of the saw blade 1. In such a manner, slicing starts to produce wafers.

During slicing, the deflection of the blade 1 is constantly monitored with the deflection detector 11 and the detector detects actual deflections. If a deflection toward the A side surface, that is, a deflection with which the saw blade 1 approaches the deflection detector 11 is detected, the pressure under which the compressed air is supplied to the A side surface is increased by successive small increments until the detected deflection is reduced to null. If a deflection toward the B side surface, that is, a deflection with which the saw blade 1 moves away from the deflection detector 11 is detected, the pressure under which the compressed air is supplied to the B side surface is increased by successive small increments until the detected deflection is reduced to null.

Since deflection of the blade 1 cannot occur on both of the A side and B side surfaces at the same time, the operation of increasing the pressure is always effected on one of the surfaces.

Another method can be effected in the slicing apparatus shown in FIG. 1. The deflection of the blade is constantly monitored and actual deflections of the A side and B side surfaces are detected with the blade deflection detector 11, while the coolant is continuously supplied during slicing through a slicing operation. When an actual deflection toward the A side surface is detected, the compressed air begins to blown through the air nozzle near the A side and on the other hand, when an actual deflection toward the B side surface is detected, the compressed air begins to blow through the air nozzle near the B side The secondary pressure of one of the pressure regulators 6 and 7 is controlled higher or lower as the blade 1 is deflected larger or smaller. When an actual deflection is larger, the compressed air under a higher pressure is blown to the blade 1, compared with one in a case when the deflection is smaller.

Here, comparative experiments were made to make clear the unique features and effects of the present invention. The slicing apparatus shown in FIG. 1 is used in the comparative experiments. In the experiments, a pair of cuts of two modes were repeated in respective two silicing operations, wherein a wafer has sliced in a cut and in one of the slicing operations the deflection is directed in one and the same manner to the A side surface of the blade (hereinafter referred to as Case 1), but in the other operation to the B side surface (hereinafter referred to as Case 2). The measurements of deflection were conducted on wafers from every pair of the two mode cuts, wherein the maxima in the two cuts were measured respectively to compare with each other. One of said two modes of cuts was a slicing method of the present invention (in short referred to as Method 1) and the other was a traditional method (in short referred to as Method 2). In particular, Method 1 is to make thinner the coolant film thickness on a side surface, to which side a deflection is detected, by blowing the compressed air under a pressure regulated such that pressure may be adjusted higher or lower, as the blade is deflected larger or smaller during slicing of a semiconductor ingot and Method 2 is not to use blowing of the compressed air to the blade during slicing.

Figure 4:
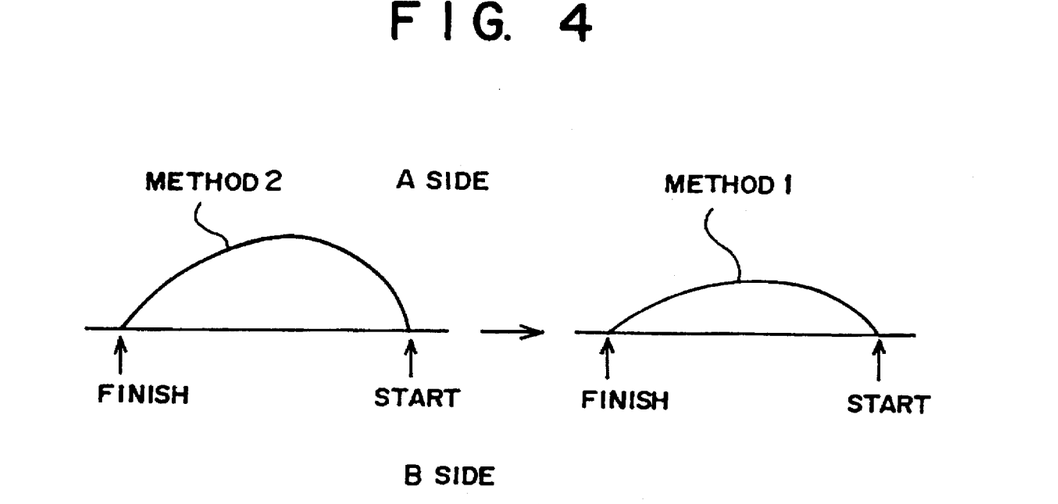
FIG. 4 is a representation showing curved changes in deflection of the A side surface of the blade versus time which changes comprise two different methods during slicing, wherein the two different methods consist of Method 1 and Method 2 (later will be explained)
Figure 5:
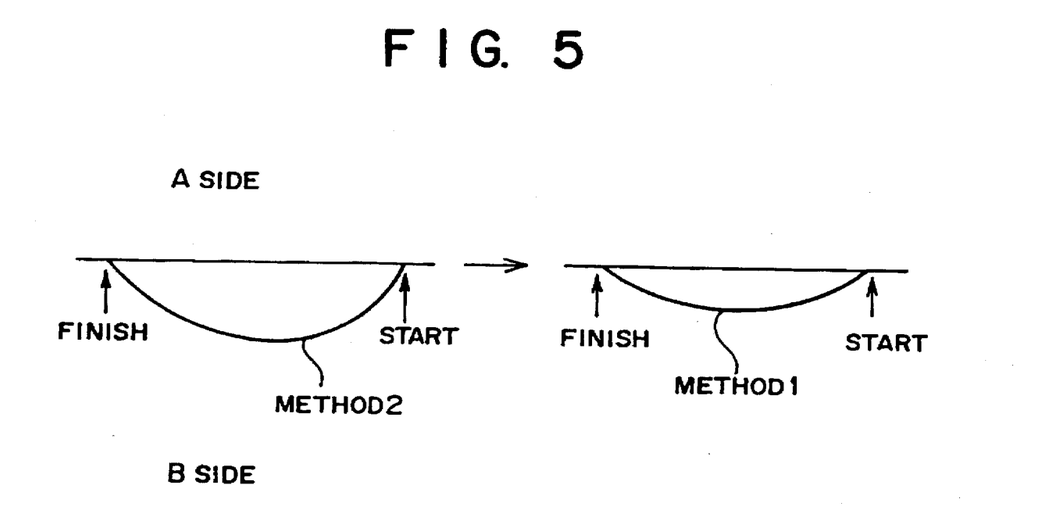
FIG. 5 is a representation showing curved changes in deflection of the B side surface of the blade versus time which changes comprise the same two different methods as in FIG. 4 during slicing.

Table 1 shows the results from the experiments in Case 1 and Table 2 shows the results from the experiments in Case 2. Blade deflections of the two cases each is plotted on the slicing time of two cuts each having a different mode, which are respectively shown in FIGS. 4 and 5. The units of the deflection and the amount of correction thereof are both μm. The tables say from comparison between each pair of the maxima of deflections in the two mode cuts that deflections are larger in Method 2 than in Method 1 and thus the deflections in Method 2 are correctable by means of Method 1. It is seen from the Table 1 that correction of the blade deflection in Case 1 amounts to 5.2 μm on the average. It is also seen from Table 2 that correction of the blade deflection in Case 2 amounts to 3.2 μm on the average.

TABLE 1

(Case 1)

| Experiment No. | Method 1 or 2 | Actual Deflections: μm | | Amount of Correction: μm | |
|---|---|---|---|---|---|
| | | A side | B side | A side | B side |
| 1 | 2 | 13 | 0 | −7 | 0 |
| | 1 | 6 | 0 | | |
| 2 | 2 | 10 | 0 | −5 | 0 |
| | 1 | 5 | 0 | | |
| 3 | 2 | 12 | 0 | −8 | 0 |
| | 1 | 4 | 0 | | |
| 4 | 2 | 8 | 0 | −4 | 0 |
| | 1 | 6 | 0 | | |
| 5 | 2 | 5 | 0 | −2 | 0 |
| | 1 | 3 | 0 | | |
| The average Amount of Correction of Deflections | | | | −5.2 | 0 |

TABLE 2

(Case 2)

| Experiment No. | Method 1 or 2 | Actual Deflections: μm | | Amount of Correction: μm | |
|---|---|---|---|---|---|
| | | A side | B side | A side | B side |
| 1 | 2 | 0 | −17 | 0 | −4 |
| | 1 | 0 | −13 | | |
| 2 | 2 | 0 | −19 | 0 | −5 |
| | 1 | 0 | −14 | | |

TABLE 2-continued (Case 2)

| Experiment No. | Method 1 or 2 | Actual Deflections: μm | | Amount of Correction: μm | |
|---|---|---|---|---|---|
| | | A side | B side | A side | B side |
| 3 | 2 | 0 | −18 | 0 | −2 |
| | 1 | 0 | −16 | | |
| 4 | 2 | 0 | −17 | 0 | −1 |
| | 1 | 0 | −16 | | |
| 5 | 2 | 0 | −18 | 0 | −4 |
| | 1 | 0 | −14 | | |
| The average Amount of Correction of Deflections | | | | 0 | −3.2 |

We claim:

1. A method for slicing a workpiece in which the workpiece is sliced into thin plates by a saw blade having a cutting edge at a peripheral margin, while a coolant is supplied to both side surfaces of the blade comprising the following steps of: detecting deflection of the blade thereof and regulating a coolant film thickness on a first side surface of the blade, to which side the blade is deflected, so as to be thinner than that on a second side surface thereof, wherein the step of regulating includes blowing compressed air to the first side surface, a stream of said compressed air being directed to a spot on the cutting edge distant from an intersection of the cutting edge and the workpiece.

2. A method for slicing a workpiece as claimed in claim 1, wherein said regulating step comprises controlling a difference in coolant film thickness between both side surfaces of the blade so as to be larger or smaller, as the blade is deflected larger or smaller.

3. A method for slicing a workpiece as claimed in claim 1, wherein said step of regulating a coolant film thickness on the first side surface includes blowing compressed air to the same side, thinning the coolant film thickness.

4. A method for slicing a workpiece as claimed in claim 2, wherein said regulating step of controlling the difference in coolant film thickness between both side surfaces of the blade includes blowing compressed air to one or both surfaces.

5. A method for slicing a workpiece as claimed in claim 3, wherein said regulating step includes regulating a pressure of the compressed air to be higher or lower, as the blade is deflected larger or smaller.

6. A method for slicing a workpiece as claimed in claim 1, wherein said workpiece is a semiconductor ingot.

7. A method for slicing a workpiece as claimed in claim 1, wherein said blade is an annular saw blade with a cutting edge at an inner periphery margin of the blade.

8. A method for slicing a workpiece in which the workpiece is sliced into thin plates by an annular saw blade having a cutting edge at an inner peripheral margin, while a coolant is supplied to both side surfaces of the blade comprising the following steps of: decreasing by a predetermined amount a coolant film thickness on each side of the blade by continuously supplying compressed air to both side surfaces of the blade; detecting a deflection of the blade at a side or both sides; and regulating a coolant film thickness on a first side surface of the blade, to which side the blade is deflected, so as to be thinner than that on a second side surface thereof.

9. An apparatus for slicing a workpiece in which the workpiece is sliced into thin plates by a saw blade having a cutting edge at a periphery margin, while a coolant is supplied to both side surfaces of the blade, comprising: air nozzles equipped near both sides of the blade for blowing compressed air to the blade side surfaces to regulate a thickness of a film of said coolant; a compressed air supply source pneumatically connected to the air-nozzles via respective pressure regulators; a deflection detector for the blade disposed near one of the side surfaces of the blade; and a computer electrically connected to the deflection detector at an input port and at an output port to the pressure regulators, wherein the deflection detector for the blade transmits signals to the computer and the same computer transmits signals to the pressure regulators for regulating said thickness of said coolant film on either side of the blade by regulating a secondary pressure of a regulator higher or lower, as the blade is deflected larger or smaller.

10. An apparatus for slicing a workpiece claimed in claim 9, wherein an annular saw blade with a cutting edge at an inner peripheral margin thereof is used as the blade.

* * * * *